US005997982A

United States Patent [19]

Susat

[11] Patent Number: 5,997,982

[45] Date of Patent: Dec. 7, 1999

[54] SCREEN DOOR SCREEN SAVER

[76] Inventor: Richard J. Susat, 11 Conver Dr., Saratoga Springs, N.Y. 12866-9740

[21] Appl. No.: 08/726,819

[22] Filed: Oct. 7, 1996

Related U.S. Application Data

[63] Continuation-in-part of application No. 08/546,703, Oct. 23, 1995, abandoned.

[51] Int. Cl.[6] ........ B32B 3/06

[52] U.S. Cl. ........ 428/100; 428/99; 428/63; 156/94

[58] Field of Search ........ 428/99, 100, 13, 428/63; 156/94

[56] References Cited

U.S. PATENT DOCUMENTS

| | | | |
|---|---|---|---|
| D. 274,944 | 7/1984 | Coppa | D25/48 |
| D. 286,354 | 10/1986 | Giraco | D20/11 |
| 736,751 | 8/1903 | Lobmiller | 428/13 |
| 4,222,162 | 9/1980 | Levy | 29/402 |
| 4,642,257 | 2/1987 | Chase | 428/63 |
| 4,678,690 | 7/1987 | Palmer et al. | 428/31 |
| 4,857,401 | 8/1989 | Seiverding | 428/336 |
| 4,962,602 | 10/1990 | Meyrowitsch | 40/541 |
| 5,599,594 | 2/1997 | Pauley | 428/13 |

*Primary Examiner*—Alexander Thomas

[57] ABSTRACT

A screen saver (10) capable of attachment to a screen door screen (14) of a screen door. The screen saver (10) has an inner member (12A) and an outer member (12B) attached to each other through mesh of a screen door utilizing hook and loop. The inner member (12A) having an inner member front (12AA) and an inner member back (12AB). The inner member back (12AB) further comprises inner member back fastening means (12ABA) securely affixed thereon. The outer member (12B) having an outer member front (12BA) and an outer member back (12BB). The outer member back (12BB) further comprises an outer member back fastening means (12BBA) securely affixed thereon. The inner member front (12AA) and outer member front (12BA) each comprise a reflective surface thereon. The inner member front (12AA) and outer member front (12BA) are shaped at a convex angle with respect to the screen door screen (14) to create a refractive index.

1 Claim, 6 Drawing Sheets

SCREEN DOOR SCREEN SAVER

CROSS REFERENCE TO RELATED APPLICATIONS

This application is a continuation-in-part of the copending patent application Ser. No. 08/546,703 filed on Oct. 23, 1995 titled, Screen Door Screen Saver, now abandoned.

BACKGROUND OF THE INVENTION

1. Field of the Invention

The present invention relates to screen saving device. More particularly, the present invention relates to screen saving device which is placed at eye level on opposite sides of a screen door to alert a user approaching the door from either the front or either side of the door, that the screen door is in a closed position.

2. Description of the Prior Art

Screens of screen doors are constantly being walked into by adults, children and pets. This causes millions of dollars of household damage per annum. The present invention which may be placed at any eye level height to accommodate adults, children, or pets and assists in preventing the prevents inadvertent walking into a screen of a screen door.

Numerous innovations for decals have been provided in the prior art that are described as follows. Even though these innovations may be suitable for the specific individual purposes to which they address, they differ from the present invention as hereinafter contrasted.

In U.S. Pat. No. Des. 286,554, titled, Decal or the Like, invented by Antoine Giraco comprises an ornamental design or decal or the like. This patented invention differs from the present invention because the patented invention is simply a design for decals or the like.

In U.S. Pat. No. Des. 274,944, titled, Decorative screen door invented by Ciro C. Copa comprises an ornamental design for a decorative screen door. substantially as shown and described. This patented invention differs from the present invention because it depicts an ornamental wood screen door design and not a screen door screen saver device as described in the present invention.

In U.S. Pat. No. 4,678,690, titled Premasked Decal, Invented by Emery A Palmer et al., a premasked decal comprises a decal transfer and a strippable tinted transparent premask adhering to the front surface of the decal transfer and where the decal transfer is visible through the premask. The premask has either a reflective metallic appearance, a neutral optical density, or preferably both, which imparts to the premask a readily visible contrasting appearance against any adjacent background color. This serves to visually indicate the need for removal of the premask from the installed decal transfer. The use of a metal layer to provide a reflective metallic appearance advantageously dissipates static electricity during assembly of the decal so that dust and grit are not attracted.

This patented invention differs from the present invention because it is a decal which must be applied to a hard smooth surface aimed specifically at the automotive field. In addition, the patented invention has an adhering means whereby the screen door screen saver is attachable through the mesh of a screen.

In U.S. Pat. No. 4,857,401, titled decorative Foils And Decals, Invented by David L. Sieverding, a heat shaped and deformable composite comprising (i) a thermoplastic layer of plastic which softens to a flowable condition at temperatures in the range of above approximately 20 degrees Celsius to approximately 110 degrees Celsius is adhesively bonded to (ii) a foil layer having a thickness less than that of (i); a process of making the heat shapeable and deformable composite which comprises heat compressing (i) to (i); and handcraffing the composite by subjecting a composite of (i) adhesively bonded to (ii) to a temperature above the softening temperature of the thermoplastic layer and softening the thermoplastic layer, removing the heated composite from the application of heat such that its temperature is caused to decreases, shaping the composite while the thermoplastic layer is still soft, and cooling the composite to a temperature below the thermoplastic's softening temperature.

The above described patented invention differs from the present invention because the patented invention is a process for combining a decorative surface to various plastic background layers.

In U.S. Pat. No. 4,962,602, titled Sticker for Alarm System, invented by Ralph S. Meyrowitsch, consisting of a label for an alarm system having a light emitting diode and an integrated electronic circuit. The circuit causes and the diode is sandwiched between at least two sheets of material. The flashing diode makes the alarm warning highly conspicuous, particularly in dim day light or darkness.

This patented invention differs from the present invention because it is a self adhesive sticker which must be applied to hard smooth surface. It requires an electrical connection and it is specific to alarm systems—Home, auto, etc.

In U.S. Pat. No. 4,222,162, titled Screen Repair, invented by Levy disclosed is a device specifically designed as a patching system and method for repairing a screen having a defect in it, which employs two patches interconnectable through the screen in overlying relationship with the defect.

This patented invention differs from the present invention because whereas the device of the Levy patent is also elliptical, both its front and back embers are flat in relation to the screen upon which it is affixed. The present invention, in contrast, describes the use of an inner member and outer member which each form a convex angle with respect to the screen, allowing persons approaching the screen from the side to easily see the device as a result of the refractive index inherent therein. In addition, unlike the invention by Levy, the present invention provides for inner and outer members constructed of a clear material so as to create a refractive index which functions to reflect the reflective sub surface in an omnidirectional array.

Numerous innovations for decals have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is innovative in concept since to allows a screen saver to have an inner member and an outer member which are removably fastened through mesh of the screen door preferably utilizing hook and loop. The inner and outer members are at a convex angle with respect to the screen and are manufactured from a clear material so as to create a refractive index. The screen saver can be adjusted to any height to accommodate different sized adults, children and/or pets. In addition multiple screen savers can be attached to a screen door at different heights.

The types of problems encountered is that adults, children and pets are constantly inadvertently walking into screens of screen doors resulting in millions of dollars of household damage per year.

Unsuccessful attempts to solve this problem were attempted namely: placement of decals on screen door screens. However, the problem was solved by the present invention because it is easily removable and repositionable having an inner and outer member to prevent damage to the screen when an adult, child or pet walks out or in the screen door. The present invention is easily removable and repositionable.

Innovations are rapidly being exploited to minimize household damage which causes millions of dollars in insurance claims and hence, increases insurance rates to the consumer.

The present invention went contrary to the teaching of the art which was simply adhesive decal stickers.

The present invention solved a long felt need to prevent walking into closed screen doors.

The present invention produced unexpected results namely: by utilizing luminescent paint and/or reflective indica, the screen saver prevents walking into a screen door at night.

Accordingly, it is an object of the present invention to provide a screen saver having an inner and outer member attached to each other through the mesh of a screen door utilizing hook and loop.

More particularly, it is an object of the present invention to provide a screen saver having inner member front and rear indica which is selected from a group of indica consisting of designs, figures, letters, primary colors, pastel colors, florescent colors, luminescence, phosphorescence, and pictures.

In addition, it is an object of the present invention to provide inner and outer members at a convex angle with respect to the screen.

Furthermore, it is an object of the present invention to provide inner and outer members that are manufactured from a clear material so as to create a refractive index.

In keeping with these objects, and with others which will become apparent hereinafter, one feature of the present invention resides, briefly stated, in the screen saver such that the inner member and the outer member are manufactured from a group of materials consisting of plastic, plastic composites, rubber, rubber composites, metal, metal alloys, fiberglass, epoxy, carbon-graphite, wood, clay and glass.

When the screen saver is designed in accordance with the present invention, the inner member back fastening means and the outer member back fastening means are selected from a group of fastening means consisting of hook and loop, permanent adhesive, semi-permanent adhesive, snaps, and double-sided tape.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawing(s).

BRIEF LIST OF REFERENCE NUMERALS UTILIZED IN THE DRAWING

10—screen saver 10
12A—inner member 12A
12AA—inner member front 12AA
12AAA—inner member front indica 12AAA
12AB—inner member back 12AB
12ABA—inner member back fastening means 12ABA
12B—outer member 12B
12BA—outer member front 12BA
12BAA—outer member front indica 12BAA
12BB—outer member back 12BB
12BBA—outer member back fastening means 12BBA
14—screen door 14
14A—screen door screen 14A

DETAILED DESCRIPTION OF THE PREFERRED EMBODIMENT

Figure 1:
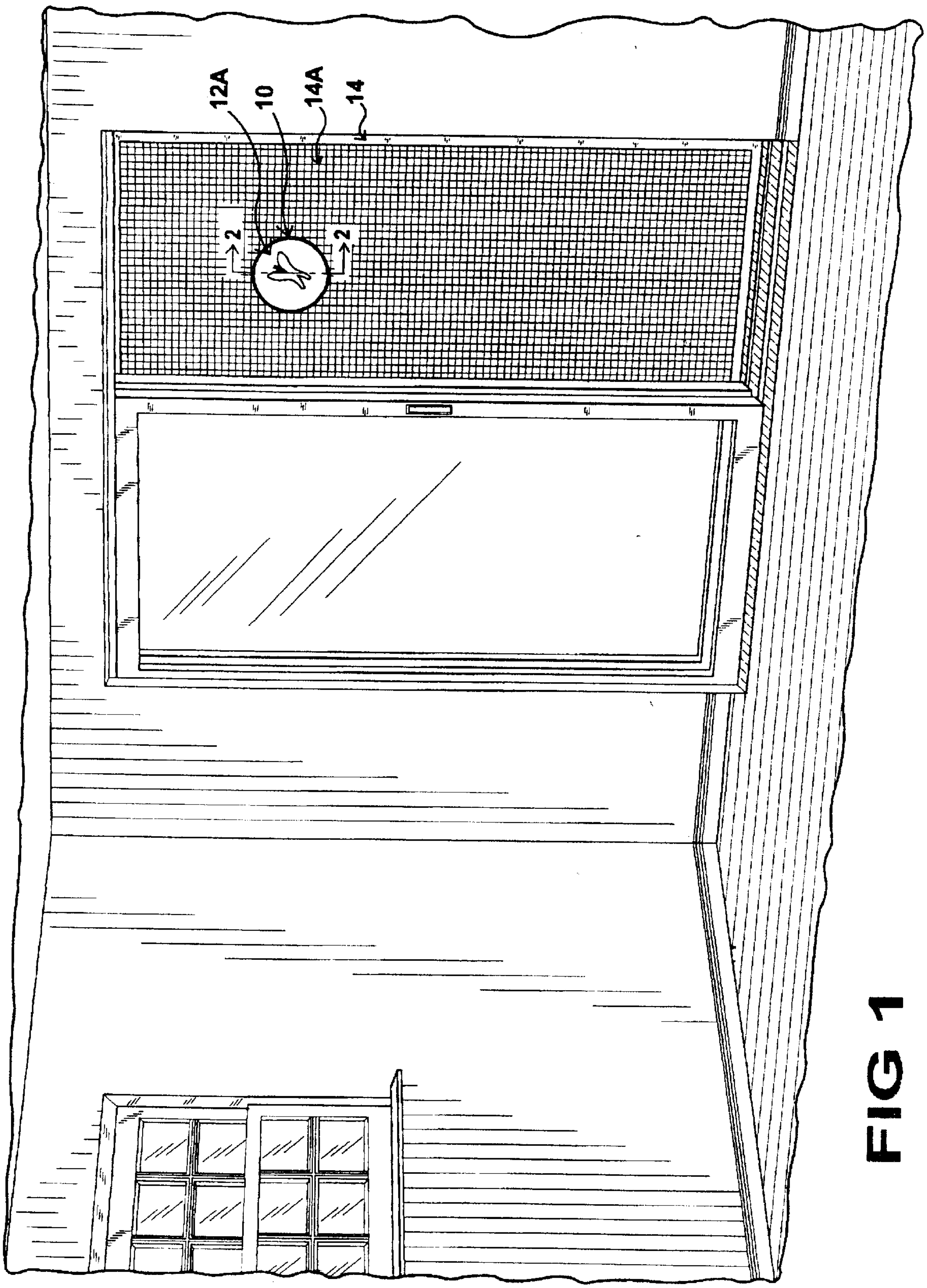
FIG. 1 is a is a perspective view of the screen saver attached to a screen door screen of a screen door.

Firstly, referring to FIG. 1 which is a is a perspective view of the screen saver 10 attached to a screen door screen 14A of a screen door 14. The screen saver 10 can be positioned at various heights to be at eye level for different sized adults, children and pets due to the easy removability of the inner member back fastening means 12ABA and outer member back fastening means 12BBA preferably being hook and loop.

Figure 2:
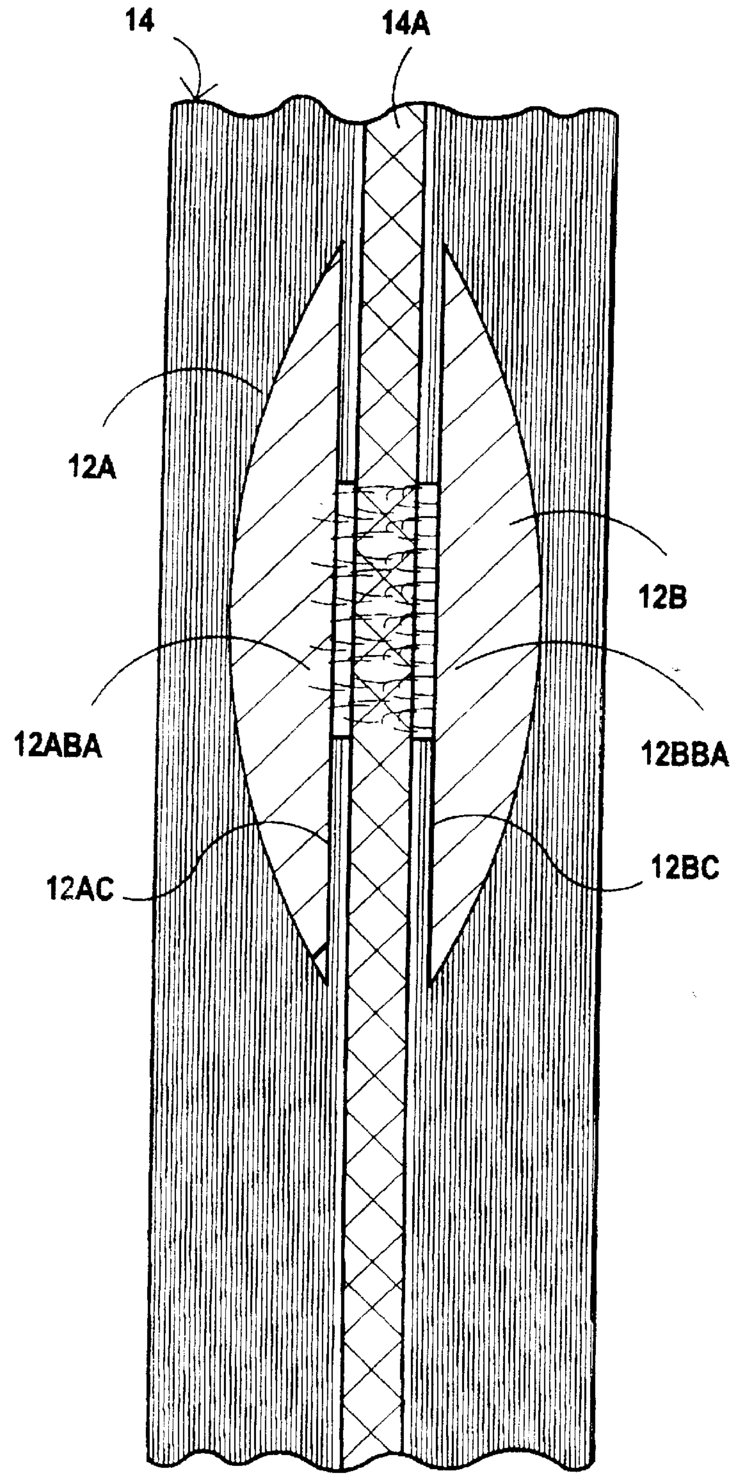
FIG. 2 is a cross sectional view along line 2—2 of FIG. 1 of a screen saver attached to a screen door screen exhibiting an inner member back fastening means attached to a outer member back fastening means through the screen door screen.

Referring to FIG. 2 which is a cross sectional view along line 2—2 of FIG. 1 of a screen saver 10 attached to a screen door screen 14A exhibiting an inner member back fastening means 12ABA attached to a outer member back fastening means 12BBA through the screen door screen 14A. The inner member back fastening means 12ABA and outer member back fastening means 12BBA affix the screen saver 10 into position by attaching through mesh of a screen door screen 14A.

The inner member front 12AA is shaped at a convex angle with respect to both the inner member back 12AB and the screen door screen 14A. The outer member front 12BA is shaped at a convex angle with respect to both the outer member back 12BB and the screen door screen 14A. The convex angle allows for easy visibility of the screen door screen 14A from either the front of the screen door screen 14A or either side of the screen door screen 14A. The inner member 12A and outer member 12B are each manufactured from a clear material so as to create a refractive index. The inner member 12A and outer member 12B further comprise a reflective surface so as to enhance visibility of the screen door screen saver 10 and screen door screen 14A.

Figure 3:
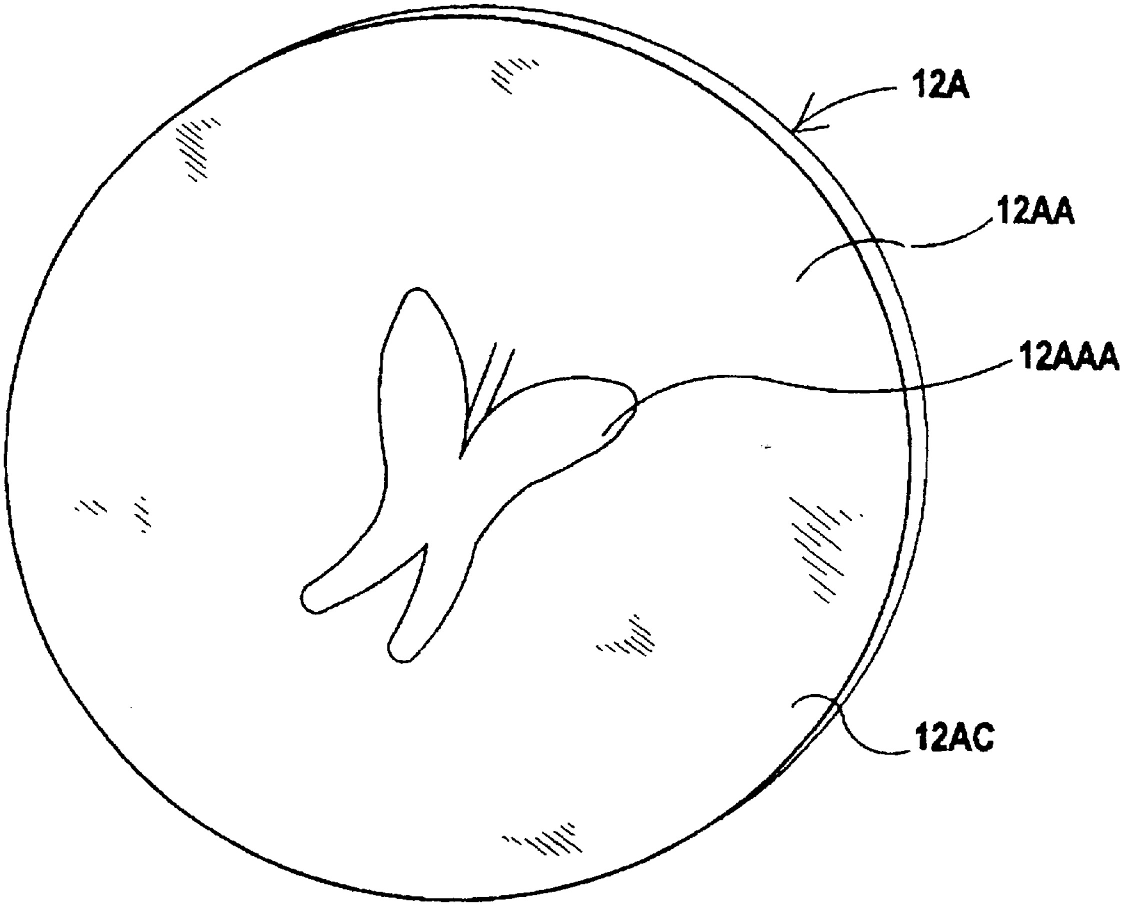
FIG. 3 is a front view of an inner member having an inner member front with inner member front indica thereon
Figure 5:
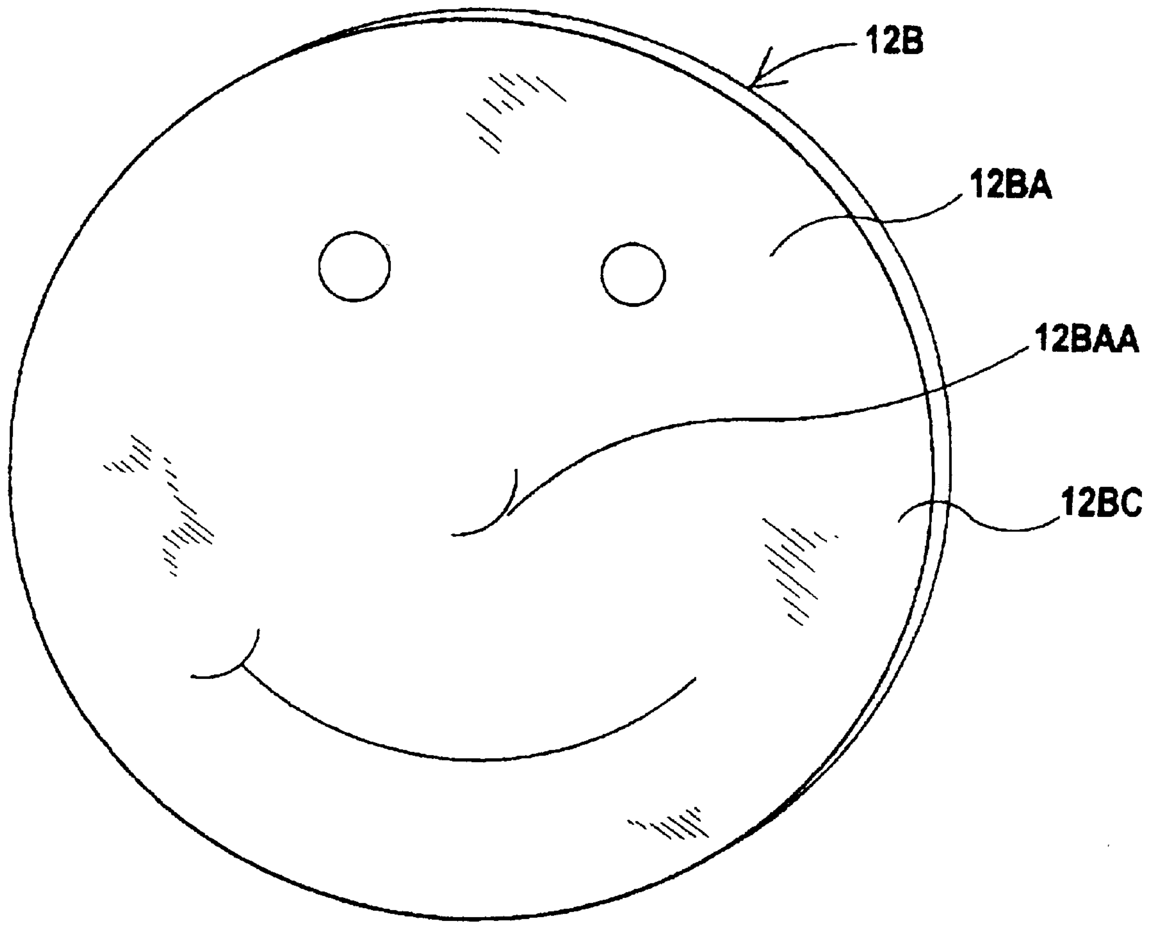
FIG. 5 is a front view of an outer member having a outer member front with outer member front indica thereon.

Now referring to FIG. 3 and FIG. 5 which are a front view of an inner member 12A having an inner member front 12AA with inner member front indica 12AAA thereon and a front view of an outer member 12B having a outer member front 12BA with outer member front indica 12BAA thereon, respectively. The inner member front indica 12AAA and outer member front indica 12BAA are selected from a group of indica consisting of designs, figures, letters, primary colors, pastel colors, florescent colors, luminescence, phosphorescence, and pictures. The inner member 12A and the outer member 12B are manufactured from a group of materials consisting of plastic, plastic composites, rubber, rubber composites, metal, metal alloys, fiberglass, epoxy, carbon-graphite, wood, clay and glass.

Figure 4:
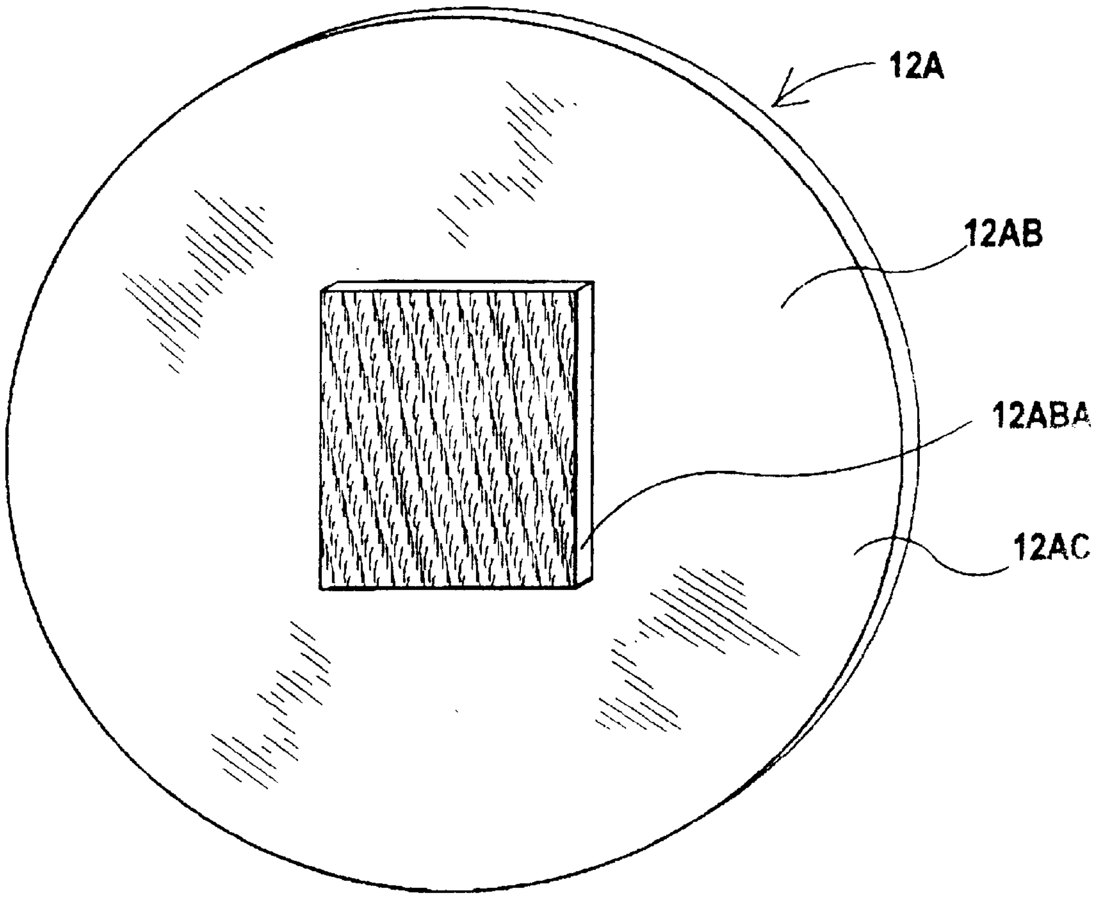
FIG. 4 is a rear view of an inner member having an inner member back with inner member back fastening means securely fastened thereon.
Figure 6:
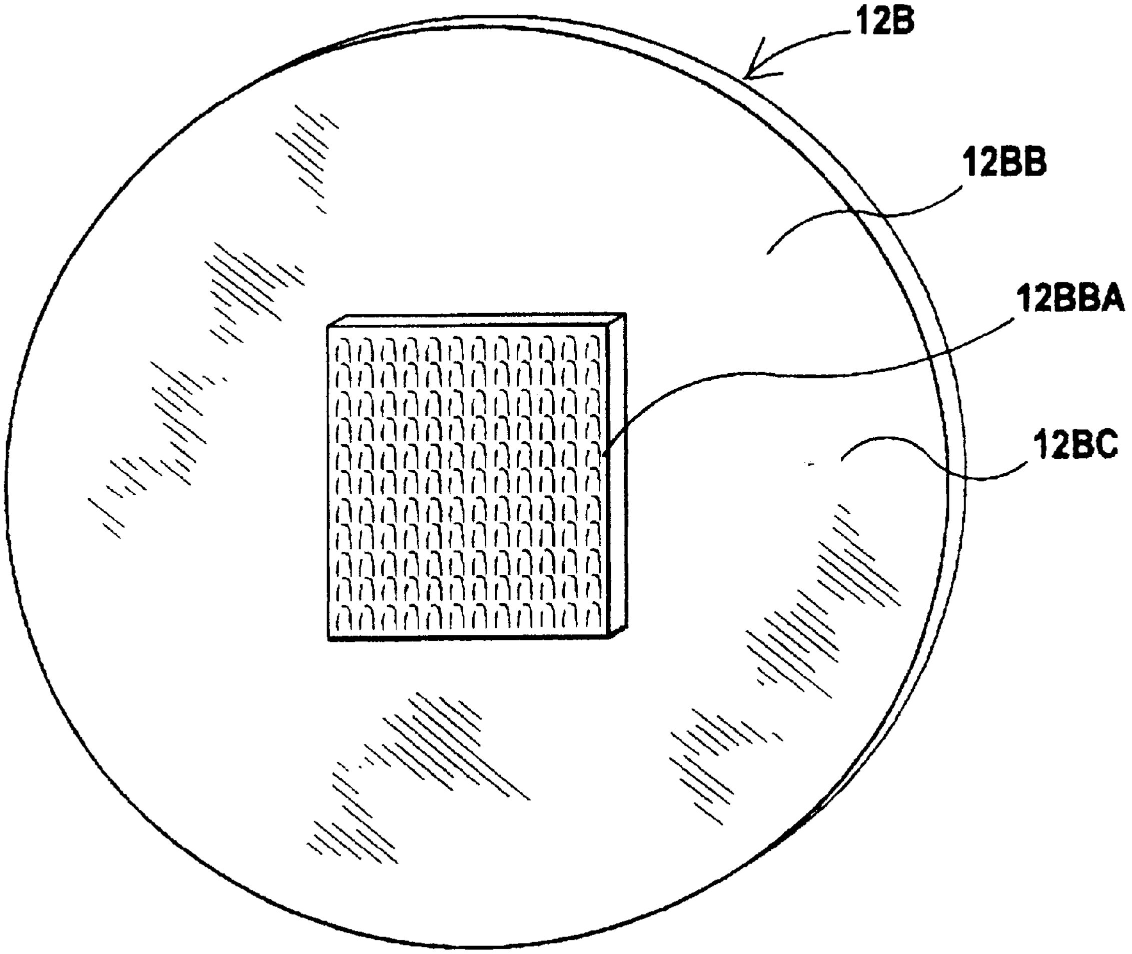
FIG. 6 is a rear view of an outer member having an outer member back with outer member back fastening means securely affixed thereon.

Lastly referring to FIG. 4 and FIG. 6 which are a rear view of an inner member 12A having an inner member back 12AB with inner member back fastening means 12ABA securely fastened thereon and a rear view of an outer member 12B having an outer member back 12BB with outer member back fastening means 12BBA securely affixed thereon, respectively. The inner member back fastening means 12ABA and the outer member back fastening means 12BBA are securely fastened upon the inner member back 12AB and the outer member back 12BB. The inner member back fastening means 12ABA and the outer member back fastening means 12BBA are selected from a group of fastening means consisting of hook and loop, permanent adhesive, semi-permanent adhesive, snaps, and double-sided tape.

It will be understood that each of the elements described above, or two or more together, may also find a useful application in other types of constructions differing from the type described above.

While the invention has been illustrated and described as embodied in a screen saver, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A screen saver (10) capable of attachment to a screen door screen (14A) of a screen door (14), the screen saver (10) comprising:

A) an inner member (12A) having an inner member front (12AA) and an inner member back (12AB), the inner member front (12AA) comprises an inner member front indicia (12AAA) thereon, the inner member front (12AA) further comprises a reflective surface thereon, the inner member front (12AA) is shaped at a convex configuration with respect to the inner member back (12AB) which further comprises an inner member back fastening means (12ABA) securely affixed thereon, the inner member front indicia (12AAA) is selected from a group of indicia consisting of designs, figures, letters, primary colors, pastel colors, florescent colors, luminescence, phosphorescence, and pictures; and B) an outer member (12B) having an outer member front (12BA) and an outer member back (12BB), the outer member front (12BA) comprises an outer member front indica (12BAA) thereon, the outer member front (12BA) further comprises a reflective surface thereon, the outer member front (12BA) is shaped at a convex configuration with respect to the outer member back (12BB), the outer member back (12BB) further comprises an outer member back fastening means (12BBA) securely affixed thereon, the inner member back fastening means (12ABA) and the outer member back fastening means (12BBA) are selected from a group of fastening means consisting of hook and loop, permanent adhesive, semi-permanent adhesive, snaps, and double-sided tape, the outer member front indica (12BAA) is selected from a group of indicia consisting of designs, figures, letters, primary colors, pastel colors, florescent colors, luminescence, and phosphorescence, the inner member (12A) and the outer member (12B) are manufactured from a material selected from a group consisting of plastic, plastic composites, rubber, rubber composites, metal, metal alloys, fiberglass, epoxy, carbon-graphite, wood, and clay.

* * * * *